(12) United States Patent
Shtivelman et al.

(10) Patent No.: US 6,259,692 B1
(45) Date of Patent: Jul. 10, 2001

(54) INTERNET CALL WAITING

(75) Inventors: Yuri Shtivelman, Belmont; Oleg Turovsky, San Francisco, both of CA (US)

(73) Assignee: Genesys Telecommunications Laboratories, Inc., San Francisco, CA (US)

( * ) Notice: Subject to any disclaimer, the term of this patent is extended or adjusted under 35 U.S.C. 154(b) by 0 days.

(21) Appl. No.: 09/592,182

(22) Filed: Jun. 12, 2000

Related U.S. Application Data

(62) Division of application No. 08/928,264, filed on Sep. 12, 1997, now Pat. No. 6,078,581.

(51) Int. Cl.[7] .................................................. H04Q 11/04
(52) U.S. Cl. .......................... 370/352; 370/389; 370/401; 370/410; 370/522; 379/93.35; 379/212; 379/215
(58) Field of Search .................................... 370/219, 220, 370/352, 355, 356, 389, 392, 401, 410, 522, 402; 379/93.09, 93.35, 201, 212, 215

(56) References Cited

U.S. PATENT DOCUMENTS

| | | | |
|---|---|---|---|
| 6,028,917 | * 2/2000 | Creamer et al. ..................... | 379/201 |
| 6,078,581 | * 6/2000 | Shtivelman et al. .................. | 370/352 |
| 6,104,800 | * 8/2000 | Benson .................................. | 379/215 |
| 6,125,113 | * 9/2000 | Farris et al. .......................... | 370/352 |
| 6,125,126 | * 9/2000 | Hallenstål ............................. | 370/522 |

* cited by examiner

*Primary Examiner*—Douglas Olms
*Assistant Examiner*—Shick Hom
(74) *Attorney, Agent, or Firm*—Donald R Boys Central Coast Patent Agency

(57) ABSTRACT

A telephony call-waiting system for clients having a computer with a video display unit (PC/VDU) and a public-switched telephony network (PSTN) telephone connected to the PSTN by a single line, keeps a status indication of the client's Internet connection status and, during periods of time the PC/VDU is connected to the Internet, alerts the client by an alert signal over the Internet connection of any waiting PSTN calls. In a preferred embodiment the client's PC/VDU is adapted to provide an audio and/or visual alert event when an alert signal is received, and to provide for a user-initiated response to an alert, accepting or rejecting a call. In the event a call is accepted, provision is made for connecting the accepted call to the client's PC/VDU as an IP call. In some embodiments several calls may be dealt with at the PC/VDU, and features are provided such as caller-ID on the client's VDU. Several ways of accomplishing the call-waiting system are taught.

11 Claims, 2 Drawing Sheets

INTERNET CALL WAITING

CROSS-REFERENCE TO RELATED DOCUMENTS

The present application is a divisional application claiming priority to application Ser. No. 08/928,264, filed Sep. 12, 1997 now U.S. Pat. No 6,078,581. The prior application is included in its' entirety by reference.

FIELD OF THE INVENTION

The present invention is in the field of Internet communication and pertains more particularly to apparatus and methods for providing call waiting services for what are known as Internet Phone (IP) calls.

BACKGROUND OF THE INVENTION

The present invention deals with telephony systems, including conventional telephone calls delivered to a telephone, and what are known now in the art as Internet Phone (IP) calls, which are telephone calls delivered over the Internet, and to which a user interfaces with a computer station, such as a personal computer (PC) during a session wherein the user is connected to the Internet. To avoid confusion a convention is adopted for the purposes of this specification wherein the conventional telephone calls delivered over the public-switched telephony network to a telephone will be called PSTN calls, and the IP calls will continue to be called IP calls.

The Internet is a global matrix of linked computers and file servers providing a virtually unlimited pool of knowledge to any user who has a connection for access. The state of the Internet is continually evolving and changing both in scope and technology. What has evolved from a type of military infrastructure has become a largely civilian superstructure allowing exchange of information to take place rapidly from almost any location in the world.

At the time of the present patent application, Internet infrastructures are largely land-based, transmitting data over digital links and analog lines, and the like. The typical user connections for the land-based infrastructure include a telephone line, a modem, and an Internet Service Provider (ISP) through which connection to the Internet is provided. Generally speaking, these connective elements are all that are required for a user to have the basic capability to access the Internet, provided the user has a PC with at least minimum system requirements.

At the time of the present patent application, it is believed by the inventor that between 60% and 80% of persons having Internet access have only one telephone line to their premises, and the one line is connected to their personal computer and is also the user's regular telephone for receiving PSTN calls. It is well known in the art that a telephone line that is connected to a computer station and receiving digital data from the Internet cannot, at the same time, receive a PSTN call. Therefore, if a person were to call someone who happens to be in a current session on the Internet and using that particular line, the person placing the call would receive a busy signal. Because of this, if the person browsing the Internet has call-waiting service, the call waiting feature has to be disabled while browsing the Internet, because a call-waiting signal would disrupt an Internet data transfer.

A typical telephone connection dedicated to accessing the Internet can be expensive to maintain for a typical family that also maintains a telephone connection for conventional PSTN call use. Many families simply cannot afford to maintain more than one telephone line as would be required to browse the Internet and also receive PSTN calls in a normal fashion. Being restricted to one telephone line that is used for both Internet access and PSTN calls can be more than just an inconvenience for a family, especially for a family with children. For example, while a user with a single phone line is browsing the Internet, one of the user's children may be trying to phone home. There is no way the user can receive even emergency calls.

Personal Computers (PCs) on the market today are typically capable of multimedia communication. For example, with the appropriate software, speakers, a standard microphone, and a sound card, a typical PC can be used as a voice communication device much like a telephone. Thus equipped, a caller can engage in two-way, real-time communication with one or more people while connected to the Internet. Since the Internet is the communication medium for such applications, there are no toll charges involved for long distance connections. While not accruing toll charges is a distinct advantage with this type of arrangement, a drawback is that persons called or calling an Internet-connected user must have a multimedia PC connected to the Internet and have the matching software installed.

What is clearly needed is a system including software executable on a multimedia PC whereby a person connected to the Internet and having only one telephone line can continue to receive PSTN calls from a user and make PSTN telephone calls to persons not connected to the Internet while he or she is engaged in an on-line browsing session. Such a system would alleviate inconvenience and concern associated with the inability to receive possibly important telephone calls while on-line. Such a method could also alleviate the expense associated with the addition of a second telephone line.

SUMMARY OF THE INVENTION

In a preferred embodiment of the present invention an Internet call-waiting telephony system is provided, comprising a telephony link adapted to connect a client's computer station and the client's public-switched telephony network (PSTN) telephone to a local PSTN switch; a port at the local PSTN switch adapted to receive PSTN calls directed to the client; a status indicator indicating the client's Internet connection status; and an IP interface adapted to convert a PSTN telephone call to an Internet telephone protocol, the IP interface connected to both the PSTN and the Internet. During time that the status indicator indicates the client is Internet-connected, on receiving a PSTN call directed to the client, the system sends, via the IP interface, an alert signal of a call waiting to an IP address associated with the client.

In preferred embodiments the system further comprises a client station having a PSTN telephone and a computer station having a video display unit (VDU), the computer station and the PSTN telephone connected to a single line connected to the telephony link. In these embodiments the computer station is adapted to provide an alert event on receipt of the alert signal of a call waiting, and to provide a user-initiated response to the IP interface, indicating one of acceptance or refusal of the call waiting. Upon acceptance response, the IP interface is adapted to connect the PSTN call to the client's computer station over the client's Internet connection. The alert event can be any one of several events or combinations of audio signals and visual indicia on the VDU.

In some embodiments, upon connection of an IP call to the client's computer station, the client's computer station is adapted to play a pre-recorded announcement to the caller. In some embodiments as well the system further comprises a second telephony switch to which the incoming PSTN calls directed to the client are forwarded, the second telephony switch being coupled to the IP interface. In some embodiments as well, the client's PC/VDU connects to the Internet through the local PSTN switch to an Internet Service provider (ISP), and the IP interface coupled to the second telephony switch connects to the Internet through the client's ISP.

There are several ways Internet call-waiting according to embodiments of the invention may be implemented. In some the client's PC/VDU connects to the Internet by dialing the ISP via a dialing string, and the dialing string comprises commands to cause the local PSTN switch to set up call forwarding of the PSTN calls directed to the client to the second telephony switch. In other embodiments there is a server coupled to the client's ISP and to the second telephony switch, and a special log-in procedure at the ISP for the client initiates action by the server to direct the second telephony switch to call the local PSTN switch with a remote call forwarding number associated with the client, directing the local PSTN switch to set up call forwarding for incoming PSTN calls directed to the client. In still other embodiments there is a server coupled to the client's ISP and to a CTI-server connected by a CTI link to the local PSTN switch, and a special log-in procedure at the ISP for the client initiates action by the server to direct the CTI-server to direct incoming PSTN calls directed to the client to the second telephony switch. The server and the CTI-server may be the same server.

In a special embodiment of the invention the IP interface is coupled to the local PSTN switch and the client's PC/VDU is adapted, when Internet connection is established, to contact a WEB server also coupled to the local PSTN switch, initiating Internet call waiting, wherein incoming calls directed to the client's PSTN telephone through the local PSTN switch are intercepted, and an alert is provided to the client's PC/VDU via the IP interface of a call waiting.

The Internet call-waiting system of the present invention, in its many embodiments, provides for the first time a way for a client having a computer and Internet connection ability, but just a single telephone line, to continue to receive PSTN telephone calls while engaged in an active Internet session. Moreover, many features are provided not before available in telephony systems.

BRIEF DESCRIPTION OF THE DRAWING FIGURES

DESCRIPTION OF THE PREFERRED EMBODIMENTS

In various embodiments of the present invention, described in enabling detail below, a telephony system is provided wherein, during the time a client is connected to the Internet, a unique call-waiting system is enabled. The unique call-waiting system alerts the client by audio and/or video display at the client's Internet-connected computer when a PSTN call is waiting. Facility is provided wherein the client can choose to connect to a waiting call, whereby the selected call is connected to the client's computer over the Internet connection as an IP call. In some embodiments facility is also provided for alerting a client to multiple calls waiting, and the client is enabled to refuse calls, connect to calls, or connect and return an automatic pre-recorded announcement. In various embodiments of the invention the client's connection status is maintained in various ways, described below in enabling detail.

Figure 1:
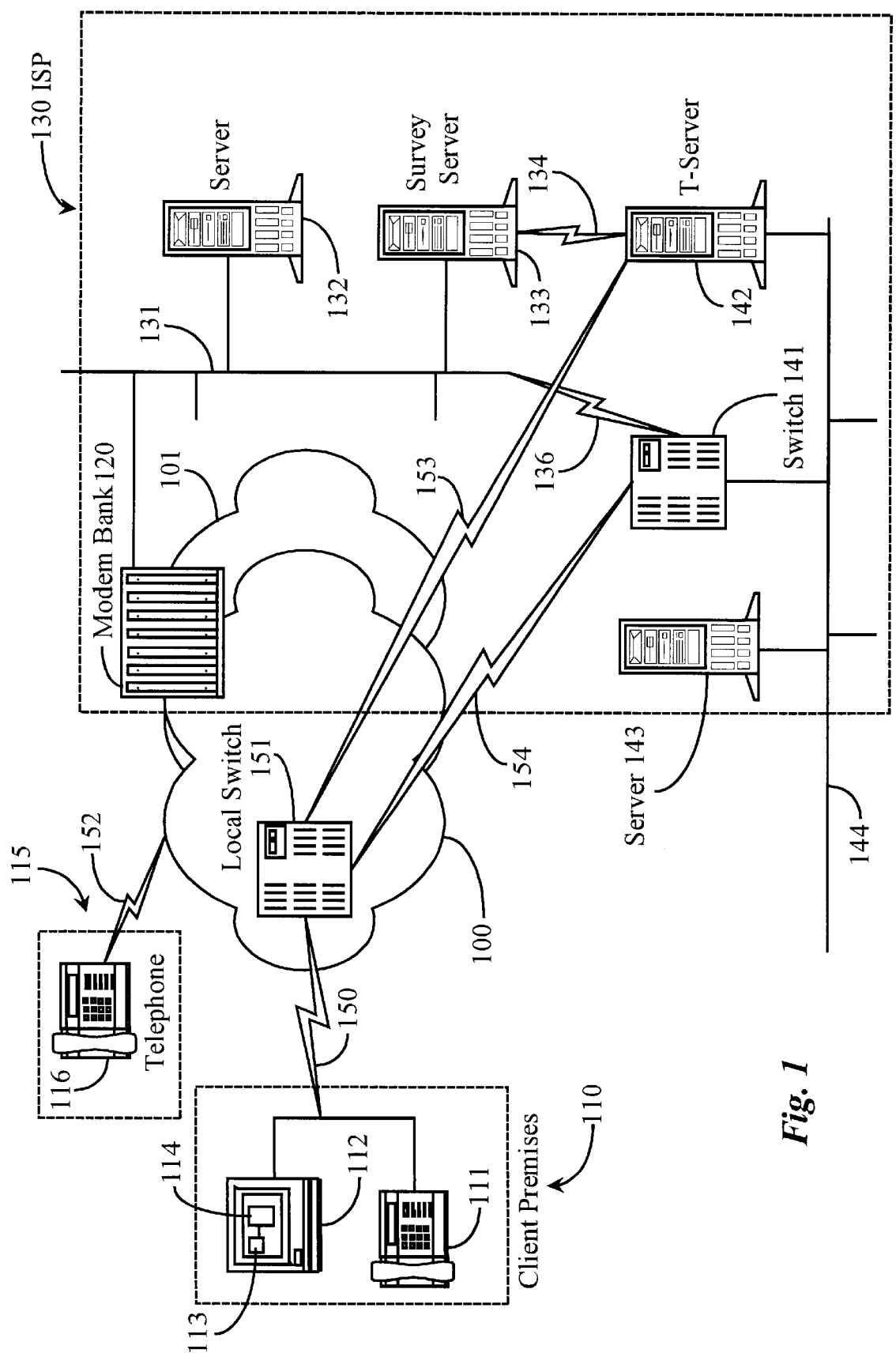
FIG. 1 is a simplified overview of a telephony system according to an embodiment of the present invention.

FIG. 1 is a simplified overview of a telephony-communication network and system according to an embodiment of the present invention, wherein PSTN telephone calls placed to a client's telephone number cause an alert to be sent to the client via the client's Internet-connected computer, and accepted calls may be converted to IP calls and connected to the client without interruption of an ongoing Internet session. In this specification the term client is used to mean any person to whom the services of the invention are provided in practicing the invention in any embodiment.

The inventor in the following disclosure teaches several embodiments of the invention wherein PSTN calls may be routed to a client having an ongoing Internet session and Internet telephone capability, after first alerting the client to the call or calls waiting. It will be apparent to the skilled artisan that the embodiments described below are examples of practice of the invention, and are not meant to be limiting. There are other possible alterations that may be made within the scope of the invention.

In the system of FIG. 1 a client premises 110 comprises a telephone 111 and a personal computer 112 sharing a telephone line and linked to a telephony switch 151 in public-switched telephone network (PSTN) 100 via a line 150. Telephony line 150 may be of the form of analog connection, digital and analog connection such as ISDN, or any other line type deemed appropriate to carry both digital data and analog data. Telephony switch 151 is exemplary of switches in the PSTN, and via switch 151 the client may place telephone calls via telephone 111 to virtually anywhere on the planet, and may also connect through the PSTN and an Internet Service Provider's (ISP) modem bank 120 to the Internet network, indicated by network cloud 101. Once connected to the ISP and logged on, the client can browse the Internet, connecting to a multitude of servers also connected to the Internet network. In embodiments of the present invention, the client at premises 110 will be logged onto the Internet as described immediately above.

In one embodiment of the present invention, a person at a premises 115 having a telephone 116 places a PSTN call to the client at station 110 using the telephone 116 connected to PSTN 100 via line 152. Caller 115 may or may not have a PC or an Internet connection. To clearly illustrate the present invention it is intended, for purposes of this example, that the person at premises 115 has no PC and is not connected to the Internet.

In one embodiment of the present invention, when a client places a call to log onto the Internet via his Internet Service Provider (ISP), a pre-defined forwarding number is programmed into telephony switch 151 using the Centrex functions of the switch, and the client's call-waiting services (if any) are temporarily discontinued. The necessary commands may be added to the dialing string, for example, that is used by the client's computer to dial-up the ISP. Centrex functions are software functions that are part of a normal telephone service such as call waiting, call forwarding, conference calling, and the like.

The number to which incoming calls for telephone 111 are forwarded is a destination number associated with a telephony switch 141. While the client is connected to the ISP, all incoming calls that are designated for the client at station 110 (telephone 111) are routed via line 154 to switch 141.

Telephony switch 141 has an IP telephony interface, that is, the switch is adapted to convert incoming calls for telephone 111 into digital Internet protocol telephone calls using a Transfer Control Protocol/Internet Protocol (TCP/IP) format and connection 136, and routing the data to the Internet. TCP/IP is a standard communication protocol that is well known in the art and utilized in much computer integrated communication with the Internet. In some embodiments the necessary hardware and software interface to do the call conversion may be integrated with telephony switch 141. In other embodiments there may be external equipment connected to switch 141 and to link 136.

At telephony switch 141 the conversion is made and the call is routed through TCP/IP link 136 to an Internet sub-net 131 hosted by ISP 130. Now converted to one of several Internet formats (actual format depends on the client's Internet phone application (IPA) 113), the call can be received by customer 110 in the form of an Internet phone call to PC 112 running an instance of an IPA 113.

To process incoming calls it is necessary that switch 141, or a processor connected to the switch, have a look-up table or other means for associating client's with IP numbers. The association is made during setup. The association can be made from destination number data arriving at switch 141 with a forwarded call. When a forwarded call is received at switch 141, an association is made to the client, the client's IP address is retrieved, and the call is forwarded to sub-net 131 as a IP telephone call. In many cases, clients will not have a permanent IP address, as the IP address for many services is assigned anew each time the client logs on. In this case, the IP address is retrieved from the client's ISP 130, or from the client's IPA 113. It will be apparent to those with skill in the art how this may be done in many ways.

In another aspect of the invention the client's computer station is adapted to deal with incoming calls in a variety of ways. This adaptation is accomplished through software, such as by a plug-in operating in concert with the client's WEB browser. An important function of this application is to alert the client to a waiting call, because the call alert is now coming on the Internet connection and not on telephone 111. In a preferred embodiment, when an incoming call is received at switch 141 an alert signal is sent over the Internet to the client at computer station 112, and the signal initiates an alert action at the client's computer. The client's software may display a telephone icon, for example, on the video display of the computer, and the alert signal may result in an audio "ringing" accomplished through the multimedia abilities of the client's computer, together with a visual effect, such as the telephone vibrating on the screen. Also in a preferred embodiment caller ID information may arrive with the alert signal, and cause the caller's ID to be displayed in conjunction with the audio/visual alert.

In a preferred embodiment the client may respond to the audio/visual alert in a number of ways. Firstly, the client may elect to accept the call, which action may be predicated in any number of ways known in the art, such as double-clicking the alert icon. When the client accepts the call, the system completes the IP call to the client via link 136, sub-net 131, and the client's Internet connection.

In alternative embodiments, additional functionality may be built in to the client's application, such as an ability to handle more than one call at a time, presenting the client with separate icons or other indicia for each call, including caller ID. The client may select to return pre-recorded messages as well, such as "Thank you for the call. I'm on an Internet session. Please call back after 4:00 PM." In another alternative the client may select to take the call as a PSTN call, and end the Internet session, at which time the system forwards the call to the client as a PSTN call to telephone 111. In yet another embodiment of the invention the client may elect to continue the Internet session, but to have the incoming call forwarded to a conventional (not Internet protocol) telephone number, such as a cellular telephone which the client may have nearby, or another telephone set in the same premises. In this embodiment the system is adapted to redirect the incoming call according to the recipient's selection. In this embodiment the client mat set his/her routing rules in subscribing to the service to have incoming calls during browsing sessions redirected to a cell phone number, an alternate telephone at or near his/her premises, or to some other destination. Alternatively the client may select a forwarding after being alerted to an incoming call.

In embodiments of the invention switch 141 and associated equipment along with a subscription service allowing client's to register and provide the necessary information to use the service (telephone number, IP address, etc.), may be implemented in a number of ways. For example, this equipment and service may be provided by an Internet Service Provider, such as ISP 130, as shown in FIG. 1, or may be provided by, for example, a local telephone company.

In an alternative embodiment of the present invention, initiation of service through switch 141 is accomplished through ISP 130, rather than by call forwarding via the Centrex functions of a PSTN switch, as in the first embodiment described above. Referring again to FIG. 1, in this alternative embodiment, at the time of Internet connection, using an amended log-in procedure for subscribers to the service, a command is sent from modem bank 120 associated with ISP 130 to a telephone-survey server 133 connected to sub-net 131 of ISP 131. Telephone survey server 133 is a special server hosted by ISP 130 in this embodiment, and is the repository of the subscriber list, look-up tables for associating subscriber's numbers with IP addresses, and so forth, as described above.

Telephone-survey server 133 is connected via digital link 134 to a CTI-server (hereinafter T-Server) 142. It will be apparent to one with skill in the art that T-server 142 and telephone-survey server 133 may be one server capable of the required functions of the present invention. Separate servers are illustrated here for the explicit purpose of describing separate functionality.

T-server 142 in this embodiment is a CTI-Sever capable of monitoring and directing activities of switch 141. T-Server 142 receives direction via link 134 from telephone-survey server 133 and directs switch 141 to initiate a call to the remote access forwarding number of the client, thereby directing forwarding of incoming calls for the client to a number at switch 141. From this point operation is the same as described above for the first embodiment, with incoming calls being converted at the IP interface associated with switch 141 to TCP/IP protocol and routed to the client via connection 136 and ISP 130.

There are certain advantages to this embodiment made possible by the unique server capability. One advantage is that due to bypassing the centrex functions of telephony switch 151 by having the modem bank initiate the forwarding command to T-server 142, no delay would be experienced by customer 110 in logging on to the Internet.

Another advantage of a server-controlled environment is that with appropriate software features available with PC 112 (plug-in 114), a method is enabled whereby the client at station 110 can place a call to a person not connected to the Internet such as a friend, or public business, and so on, without disconnecting from the browsing session. To further illustrate, assume that customer 110 is engaged in a current Internet session with a single line, and has realized that he must place a time-sensitive call to confirm a business appointment. Icons available through his plug-in 114 could be matched with the conventional telephone number of the person he desires to contact. This can be done either by accessing telephone-survey server 133 over the Internet and initiating the appropriate configuration of the selected icon to that particular analog number, or by obtaining the desired number from a telephone book and manually configuring it to the selected icon. Instead of dialing the analog number from the single Internet-connected analog telephone as would be required without the appropriate software, customer 110 double clicks the icon representing the desired contact and Internet phone application 113 places a digital call through modem bank 120, sub-net 131, and TCP/IP link 136 to telephony switch 141 where the digital call is converted to analog. Switch 141 then places the analog call to the desired destination, and performs the two-way conversion required for the on-going call once connection is made. Associated toll charges could be stored on a separate server such as server 143, and later billed to customer 110 in a conventional manner such as on his telephone bill.

It will be apparent to one with skill in the art that once connected to an analog phone, continued analog to digital and digital to analog data conversion would be required to maintain dialog in the conversation. A full-duplex sound card will be required on PC 112 to enable the client at station 110 to receive and send audio at the same time, avoiding problems such as the need to wait until the incoming transaction is complete before speaking and so on.

In another embodiment of the invention switch 151 is connected to CTI-server 142 via a CTI link 153, (FIG. 1) and T-Server 142 may thereby monitor and direct activities of switch 151 directly. In this embodiment, when the client at station 110 logs on to ISP 130 via modem bank 120, T-Server 142 recognizes the activity, and sets up call forwarding of incoming PSTN calls for that client to switch 141, where such calls are converted and directed via the Internet as described above for the first two embodiments.

In yet another embodiment of the invention, the local telephone company may have a server (not shown) connected to switch 151 for performing functions according to the present invention. This server could be a CTI-server connected via a CTI link and executing a CTI application, or could be a server of another sort, or the functionality may be integrated with the functions of switch 151. The special server is Internet-connected, and hosts a WEB page. In this embodiment plug-in 114 in the client's WEB Browser, after connection is made to the Internet through switch 151, negotiates with the server through the Internet, which then sets up switch 151 to redirect incoming calls through the Internet to the client. This embodiment has the advantage of providing all the necessary services at the local PSTN switch hosted by the phone company, and the ISP need not be involved.

It will be apparent to one with skill in the art that the hardware used in various embodiments of the present invention is well known in the art and can be utilized in various ways without departing from the spirit and scope of the invention.

In some embodiments of the present invention, any one of several commercially-available Internet telephone software packages may be used.

Figure 2:
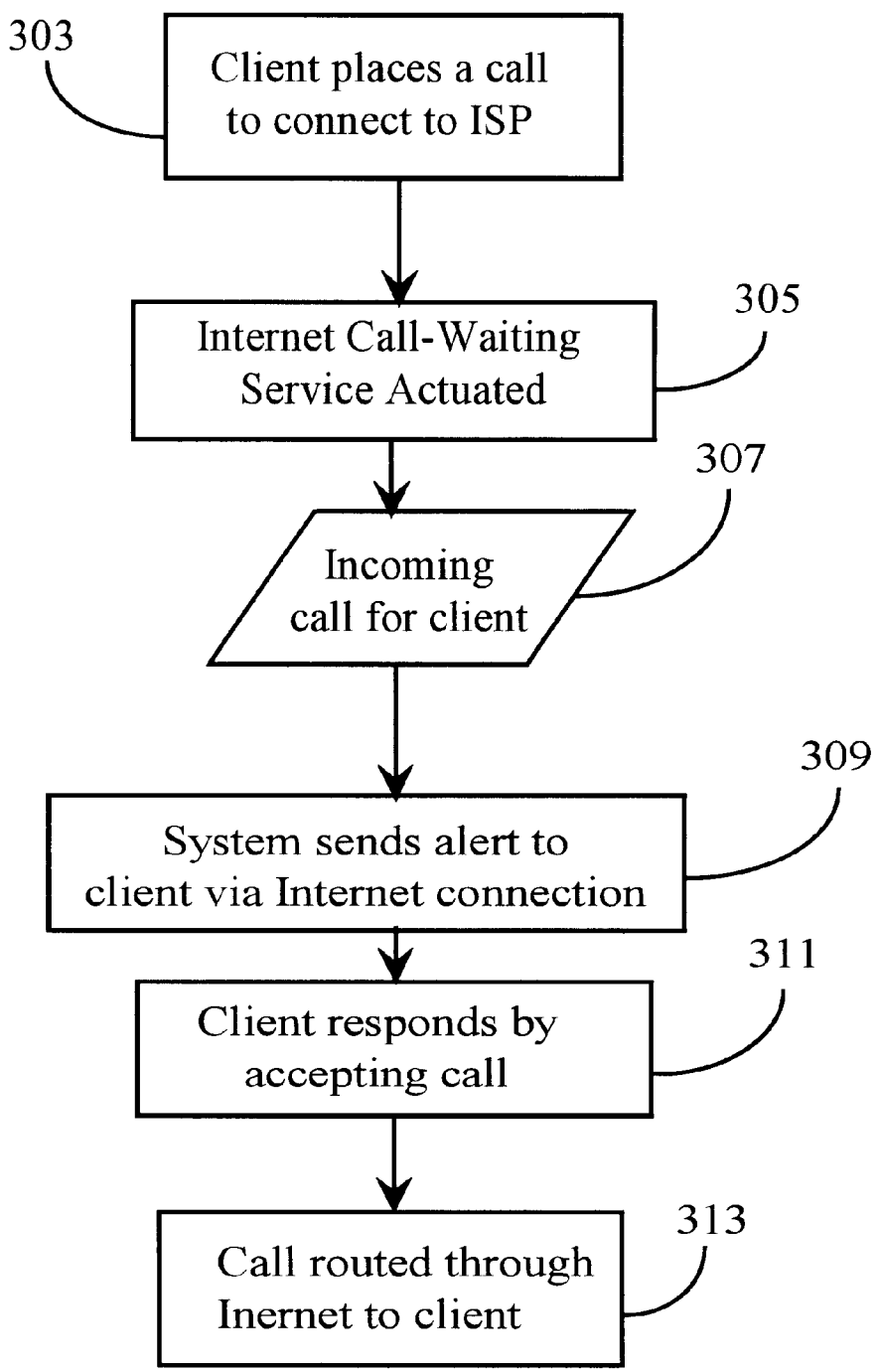
FIG. 2 is a simplified process flow chart illustrating a basic features in an embodiment of the present invention.

FIG. 2 is a process flow chart illustrating various steps in practicing an embodiment of the present invention in a general and broad sense At step 303 the client places a call to access his/her dialup ISP. The system at step 305 activates Internet call-waiting for that client while the client is connected to the Internet through the ISP.

At step 307 an incoming call is placed for the client. At step 309 the system sends an alert to the client via the client's Internet connection that there is a call waiting. At step 311 the client responds to the alert by accepting the call. At step 313 the incoming call is routed through the Internet to the client as an Internet phone call.

Interaction of the client's PC to incoming calls, and function of software of the client's PC in practicing the invention in other ways has been described to some extent above. In all cases there needs to be a minimum software ability at the client's station to receive Internet telephone calls, and there are several commercially-available applications for the purpose. Moreover, a plug-in for a client's WEB Browser has been described for providing functionality according to several embodiments of the present invention. Considerably more functionality may be provided in some embodiments than presently available from commercially-available Internet Phone software. The software at the client's PC, for example, may cause icons and windows to be displayed in a graphic user interface (GUI) such that incoming calls may be displayed as icons, labeled as to caller and time, and so on. Functionality may be provided such that selecting an icon may connect the call to the client's speakers and microphone such that a conversation may take place. Other windows and functions may be provided as well, and many will be apparent to those with skill in the art in addition to those that have been herein taught.

Several embodiments have herein been described for practicing the present invention, and given the teaching herein, more may be apparent to the skilled artisan. Moreover, there are many alterations that might be made in the embodiments described, without departing from the spirit and scope of the invention. There are, for example, many individual preferences in coding software while providing essentially the same functionality. There are also variations in connectivity that might be made and variations in computer platforms provided for accomplishing the ends of the invention, without departing from the spirit and scope of the invention. The breadth of the invention is limited, therefore, only by the language of the claims which follow.

What is claimed is:

1. An Internet call-waiting telephony system, comprising:
   a client computer station comprising a PSTN telephone and a video display unit (VDU), the computer station and the PSTN telephone connected to a single telephone line;
   a telephony link connecting the client's computer station and the client's public-switched telephony network (PSTN) telephone, on the single line, to a local PSTN switch;
   a port at the local PSTN switch adapted to receive PSTN telephone calls directed to the client;
   a status indicator at the PSTN switch indicating the client's Internet connection status; and
   an IP interface connected to both the PSTN and the Internet;

wherein the system, during periods of time that the status indicator indicates the client is Internet-connected, on receiving a PSTN call directed to the client, sends, via the IP interface, an alert signal of the call waiting to an IP address associated with the client, and the computer station provides an alert event comprising one or both of an audio signal and a visual indicia upon receipt of the alert signal, and enables a user-initiated response to the PSTN switch via the IP interface, indicating one of acceptance or refusal of the call waiting.

2. The system of claim 1 wherein, upon receipt of an acceptance response, the IP interface connects one of said PSTN calls to the client's computer station over the client's Internet connection converting the PSTN call to an IP call.

3. The system of claim 2 wherein, upon connection of the IP call to the client's computer station, the client's computer station plays a pre-recorded announcement to a caller of the IP call.

4. The system of claim 1 wherein the IP interface is coupled to the first local PSTN switch and the client's PC/VDU is adapted, when Internet connection is established, to contact a WEB server also coupled to the first local PSTN switch, initiating Internet call waiting, wherein incoming calls directed to the client's PSTN telephone through the local PSTN switch are intercepted, and an alert is provided to the client's PC/VDU via the IP interface of a call waiting.

5. An Internet call-waiting telephony system, comprising:
a client computer station comprising a PSTN telephone and a video display unit (VDU), the computer station and the PSTN telephone connected to a single telephone line;
a telephony link connecting the client's computer station and the client's public-switched telephony network (PSTN) telephone, on the single line, to a first local PSTN switch;
a port at the first local PSTN switch adapted to receive PSTN telephone calls directed to the client;
a status indicator at the PSTN switch indicating the client's Internet connection status;
an IP interface connected to both the PSTN and the Internet; and
a second telephony switch, coupled to the IP interface, to which said PSTN calls directed to the client may be forwarded,
wherein the client's PC/VDU connects to the Internet through the first local PSTN switch to an Internet Service provider (ISP), and wherein the IP interface coupled to the second telephony switch connects to the Internet through the client's ISP, and the system, during periods of time that the status indicator indicates the client is Internet-connected, on receiving a PSTN call directed to the client, sends, via the IP interface, an alert signal of a call waiting to an IP address associated with the client.

6. The system of claim 5 wherein the client's PC/VDU connects to the Internet by dialing the ISP via a dialing string, and the dialing string comprises commands to cause the local PSTN switch to set up call forwarding of the PSTN calls directed to the client to the second telephony switch.

7. An Internet call-waiting telephony system, comprising:
a client computer station comprising a PSTN telephone and a video display unit (VDU), the computer station and the PSTN telephone connected to a single line;
a telephony link connecting the client's computer station and the client's public-switched telephony network (PSTN) telephone, on the single telephone line, to a first local PSTN switch;
a port at the first local PSTN switch adapted to receive PSTN telephone calls directed to the client;
a status indicator at the PSTN switch indicating the client's Internet connection status;
an IP interface connected to both the PSTN and the Internet;
a second telephony switch, coupled to the IP interface, to which said PSTN calls directed to the client are forwarded; and
a server coupled to the client's ISP and to the second telephony switch;
wherein a specific log-in procedure at the ISP for the client initiates action by the server to direct the second telephony switch to call the first local PSTN switch with a remote call-forwarding number associated with the client, directing the first local PSTN switch to set up call forwarding for incoming PSTN calls directed to the client, and the system, during periods of time that the status indicator indicates the client is Internet-connected, on receiving a PSTN call directed to the client, sends, via the IP interface, an alert signal of a call waiting to an IP address associated with the client.

8. An Internet call-waiting telephony system, comprising:
a client computer station comprising a PSTN telephone and a video display unit (VDU), the computer station and the PSTN telephone connected to a single telephone line;
a telephony link connecting the client's computer station and the client's public-switched telephony network (PSTN) telephone, on the single telephone line, to a first local PSTN switch;
a port at the first local PSTN switch adapted to receive PSTN telephone calls directed to the client;
a status indicator indicating the client's Internet connection status;
an IP interface connected to both the PSTN and the Internet;
a second telephony switch, coupled to the IP interface, to which said PSTN calls directed to the client may be forwarded; and
a server coupled to the client's ISP and to a CTI-server connected by a CTI link to the local PSTN switch;
wherein a special log-in procedure at the ISP for the client initiates action by the server to direct the CTI-server to direct incoming PSTN calls directed to the client to the second telephony switch, and the system, during time that the status indicator indicates the client is Internet-connected, on receiving a PSTN call directed to the client, sends, via the IP interface, an alert signal of a call waiting to an IP address associated with the client.

9. A method for informing a client having a PSTN telephone and a computer station with a video display unit (PC/VDU) connected to a common telephony line, of a waiting PSTN telephone call during time periods when the client's PC/VDU is connected to the Internet, comprising steps of:
(a) upon receiving a PSTN call directed to the client's telephone, retrieving an IP address for the client; and
(b) sending an alert signal that a call is waiting to the client's PC/VDU via an IP interface coupled to both the PSTN and the Internet;
(c) providing an audio alert event on receipt of the alert signal of a call waiting; and (d) providing a user initiated response from the PC/VDU to the PSTN switch via the IP Interface, indicating one of acceptance or refusal of the call waiting.

10. A method for providing Internet call waiting for a client having a computer with a video display unit (PC/VDU) connected to the Internet on one line, and a PSTN telephone connected on the same line, comprising steps of:

(a) intercepting PSTN calls directed to the client's PC/VDU;

(b) retrieving an IP address for the client's PC/VDU;

(c) sending an alert signal to the client's PC/VDU via an IP interface to the Internet;

(d) providing an audio alert event on receipt of the alert signal of a call waiting;

(e) providing a user-initiated response to the PSTN switch via the IP Interface, indicating one of acceptance or refusal of the call waiting; and (e) connecting the PSTN call to the client's PC/VDU via the IP interface as an IP telephone call, upon receiving a response from the client's PC/VDU that the call has been accepted.

11. The method of claim 10 including a step wherein, upon connection of an IP call to the client's computer station in step (e), the client's computer station plays a pre-recorded announcement to the caller.

* * * * *